United States Patent
Wildburg et al.

(10) Patent No.: US 6,538,057 B1
(45) Date of Patent: *Mar. 25, 2003

(54) PROTECTIVE COLLOID STABILIZED EMULSION POLYMERIZATION OF ETHYLENICALLY UNSATURATED MONOMERS, AND ADHESIVE PRODUCT THEREOF

(75) Inventors: Gerald Wildburg, Ludwigshafen (DE); Dieter Urban, Speyer (DE); Georg Langhauser, Ruppertsberg (DE); Karl-Heinz Schumacher, Neustadt (DE); Oliver Hartz, Mannheim (DE); Eckehardt Wistuba, Bad Dürkheim (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/082,187

(22) Filed: May 21, 1998

(30) Foreign Application Priority Data

May 23, 1997 (DE) .......................................... 197 21 691

(51) Int. Cl.$^7$ .............................................. C09J 157/00
(52) U.S. Cl. ........................... 524/460; 524/17; 524/25; 524/56; 524/556; 526/75; 526/203
(58) Field of Search .................. 524/556, 17, 25, 524/56, 460; 526/75, 203

(56) References Cited

U.S. PATENT DOCUMENTS

| 3,873,480 | A | * | 3/1975 | Braidich et al. ...... 260/17.4 ST |
|---|---|---|---|---|
| 5,331,042 | A | * | 7/1994 | Charmot et al. ............ 524/556 |
| 5,358,998 | A |   | 10/1994 | Wendel et al. |
| 5,536,779 | A |   | 7/1996 | Wendel et al. |
| 5,705,563 | A |   | 1/1998 | Wendel et al. |

FOREIGN PATENT DOCUMENTS

| DE | 19644309 |   | 4/1998 |   |
|---|---|---|---|---|
| EP | 0 110 209 |   | 6/1984 |   |
| EP | 05 36 597 |   | 4/1993 |   |
| EP | 0 587 114 | * | 3/1994 | ............. C08F/2/24 |
| JP | 50055648 | * | 5/1975 | ............. C08F/2/24 |
| JP | 57087403 | * | 5/1982 | ............ C08F/18/08 |

OTHER PUBLICATIONS

Patent Abstracts of Japan, vol. 006, No. 169 (C–122), Sep. 2, 1982, JP 57 087403, May 31, 1982.

Derwent Abstracts, AN 75–71496W, JP 50 055648, May 15, 1975.

* cited by examiner

*Primary Examiner*—Kelechi Egwim
(74) *Attorney, Agent, or Firm*—Oblon, Spivak, McClelland, Maier & Neustadt, P.C.

(57) ABSTRACT

Adhesives comprising:

a) from 5.0 to 95.0% by weight of an adhesive dispersion having a viscosity in the range from 2000 to 10,000 mPa·s, which comprises (a1) an aqueous polymer dispersion which is obtainable by free-radical polymerization of a mixture M which comprises at least one ethylenically unsaturated monomer A to give a polymer P in the presence of at least one protective colloid-based on a water-soluble prepolymer which comprises at least one water-soluble monomer B, and further additives if desired, (a2) if desired, a base selected from the group consisting of alkali metal.hydroxides, ammonia and volatile organic amines, (a3) if desired, a completely water-miscible organic solvent, and, further additives; (b) from 0 to 90.0% by weight of a polysaccharide and/or a protein and/or a protein degradation product; (c) from 0 to 95.0% by weight of at least one filler; (d) from 0 to 10.0% by weight of at least one emulsifier; (e) from 0 to 30.0% by weight of further additives; (f) water to 100% by weight;

processes for their preparation, and their use.

19 Claims, No Drawings

PROTECTIVE COLLOID STABILIZED EMULSION POLYMERIZATION OF ETHYLENICALLY UNSATURATED MONOMERS, AND ADHESIVE PRODUCT THEREOF

BACKGROUND OF THE INVENTION

1. Field of the Invention

The present invention relates to adhesives comprising an aqueous polymer dispersion obtainable by free-radical copolymerization in the presence of at least one protective colloid based on a prepolymer, to processes for their preparation and to their use.

2. Description of the Background

Packaging materials made from paper, board or card, such as folding boxes, are produced, and paper labels attached to nonabsorbent substrates, especially to hollow structures made from glass, plastic or metal, such as bottles or glasses, using adhesives which are referred to in general as packaging adhesives. Systems which are widespread as packaging adhesives are those comprising a polymer dispersion or a blend of a polymer dispersion with other active adhesive constituents.

Kleb- und Dichtstoffe, Vol. 40, 6/96, p. 22 f. describes, in general terms, dispersion adhesives in the paper and packaging industry. Accordingly, monomers considered for preparing the disperse phase which forms the adhesive substance are, for example, vinyl acetate, ethylene, vinyl propionate, acrylates, and dibutyl maleate. In addition to the chemical structure of the polymer dispersion and, in particular, the particle size distribution, the nature and amount of the emulsifiers and protective colloids have a decisive influence on the adhesive properties. Since the components used to stabilize the polymer dispersion are also incorporated into the adhesive film, they influence the properties of this film, for example its water resistance. A further important property of the resulting films, especially when the adhesive is used in the application of transparent labels such as printed polymer films, for example, is its transparency. Below a temperature—the white point or minimum film-forming temperature—which is characteristic for every polymer dispersion white layers are obtained instead of transparent films, with film labels losing their transparency especially at the unprinted areas and the visual color saturation of the printed image on the label suffering an overall loss in depth and brilliance.

The adhesives systems employed for the wet labeling of bottles are predominantly those based on an acrylate dispersion which is used either alone or as a blend with natural substances of high viscosity, such as starch or casein. A disadvantage of the known packaging adhesives based on acrylate dispersions is that these dispersions generally form films which exhibit marked clouding.

An essential requirement for an adhesive system to be used for the labeling of hollow articles is the formation of a film with high adhesion and low cohesion. For optimum deployment on the customary machines for the wet labeling of bottles it is necessary for the adhesive used to have a high viscosity at low shear rates, for example a viscosity in a range from about 2000 to 10,000 mPa·s at 25 s$^{-1}$.

Particular requirements are imposed, furthermore, on adhesives to be used for the production or labeling of packaging which comes into contact with foods. Important properties then, in addition to those mentioned above, are the toxicological acceptability of the adhesive and the exclusion of factors which impair taste and odor. In addition to the toxicological aspects regarding the foods to be packaged, further particular requirements are imposed on the ingredients of the dispersions to be used in packaging adhesives in respect of any possible irritation to, and/or harm to the health of, the personnel entrusted with processing. For instance, some dispersions employed for the preparation of adhesives include butenol as polymerization regulator, which is not entirely acceptable from a toxicological standpoint.

SUMMARY OF THE INVENTION

It is an object of the present invention to provide new adhesives suitable for the production and labeling of packaging. As well as good performance properties, such as high tack, low cohesion and high viscosity at low shear rates, these adhesives should in particular form a clear, transparent film in order to avoid the abovementioned disadvantages in connection with wet labeling using transparent films.

Furthermore, the dispersions employed.should as far as possible include no components regarded as toxicologically unacceptable.

We have found that this object is achieved, surprisingly, if an aqueous polymer dispersion obtainable by free-radical copolymerization in the presence of a particular protective colloid, based on a prepolymer, is employed in adhesives.

DETAILED DESCRIPTION OF THE PREFERRED EMBODIMENTS

The invention thus provides an adhesive comprising:
a) from 5.0 to 95.0% by weight of an adhesive dispersion having a viscosity in the range from 2000 to 10,000 mPa·s, which comprises
   a1) an aqueous polymer dispersion which is obtainable by free-radical polymerization of a mixture M which comprises at least one ethylenically unsaturated monomer A to give a polymer P in the presence of at least one protective colloid based on a water-soluble prepolymer which comprises at least one water-soluble monomer B, and further additives if desired,
   a2) if desired, a base selected from the group consisting of alkali metal hydroxides, ammonia and volatile organic amines,
   a3) if desired, a completely water-miscible organic solvent,
and, if desired, further additives;
b) from 0 to 90.0% by weight of a polysaccharide and/or a protein and/or a protein degradation product;
c) from 0 to 95.0% by weight of at least one filler;
d) from 0 to 10.0% by weight of at least one emulsifier;
e) from 0 to 30.0% by weight of further additives;
f) water to 100% by weight.

Component a)

a1):

The monomer mixture M used to prepared the polymers P contains from 50 to 100% by weight, preferably 60.to 99.9% by weight, of at least one free-radically polymerizable, ethylenically unsaturated monomer A (principal monomer) and from 0 to 50% by weight, if desired from 0.1 to 40% by weight, of at least one comonomer C and also, depending on the polymerization process, if desired, at least one water-soluble monomer B in the amounts described below.

Suitable monomers A are esters of α,β-monoethylenically. unsaturated $C_3$–$C_6$ mono- and dicarboxylic acids with alkanols having preferably 1 to 12 carbons, particularly preferably 1 to 8 carbons and, in particular, 1 to 4 carbons, for example esters of acrylic and/or methacrylic acid with methanol, ethanol, n-propanol, isopropanol, n-butanol, isobutanol and 2-ethylhexanol, esters of vinyl alcohol with $C_1$–$C_{20}$ monocarboxylic acids, for example vinyl formate, acetate, propionate, n-butyrate, laurate and stearate, and vinyl esters of highly branched, saturated monocarboxylic acids having $C_9$, $C_{10}$ and $C_{11}$ side chains (Versatic acids), vinylaromatic compounds, such as styrene, α-methylstyrene, p-methylstyrene, α-n-butylstyrene, p-n-butylstyrene, p-n-decylstyrene, o-chlorostyrene or vinyltoluene, and mixtures thereof.

Suitable comonomers C are, for example, vinyl halides and vinylidene halides, for example vinyl chloride and vinylidene chloride, α,β-ethylenically unsaturated nitriles, for example acrylonitrile and methacrylonitrile, $C_2$–$C_6$ monoolefins, for example ethylene and propylene, and non-aromatic hydrocarbons having 2 to 8 carbons and at, least 2 conjugated olefinic double bonds, for example butadiene, isoprene and chloroprene, and also mixtures thereof.

Further suitable comonomers C are crosslinking monomers, which in addition to their ethylenically unsaturated double bond have an epoxy, hydroxyl, N-methylol or carbonyl function or two nonconjugated, ethylenically unsaturated double bonds. The monomer mixture M can contain from 0 to 40% by weight, preferably from 0 to 20% by weight and, with particular preference, from 0.2 to 15% by weight of these crosslinking monomers. The crosslinking reaction preferably takes place not until during the drying of the polymers, and can be accelerated by heat treatment and, if desired, by adding catalysts, for example proton donors, such as maleic acid, diammonium hydrogenphosphate or ammonium nitrate.

Examples of crosslinking monomers C are the esters of α,β-unsaturated carboxylic acids with diols, for example hydroxyalkyl acrylates and hydroxyalkyl methacrylates, N-hydroxyalkylated amides of α,β-unsaturated carboxylic acids, for example N-hydroxyalkylated acrylamides and methacrylamides, such as N-methylolacrylamide and N-methylolmethacrylamide, and also monomers having at least two vinyls, at least two vinylidenes or at least two alkenyls. Examples of these include alkylene glycol diacrylates and alkylene glycol dimethacrylates, for example ethylene glycol diacrylate, 1,3-butylene glycol diacrylate, 1,4-butylene glycol diacrylate, propylene glycol diacrylate, divinylbenzene, vinyl methacrylate, vinyl acrylate, allyl methacrylate, allyl acrylate, diallyl maleate, diallyl fumarate or methylbisacrylamide.

Other crosslinking-monomers C are acrylamidoglycolic acid and methacrylamidoglycolic acid and their ethers, esters or ether esters with alcohols, such as alkanols, having up to 12 carbons, examples being acrylamidomethoxyacetic acid, methyl acrylamidohydroxyacetate, methyl acrylamidomethoxyacetate, ethacrylamidomethoxyacetic acid, methyl ethacrylamidohydroxyacetate, methyl ethacrylamidomethoxyacetate, and the corresponding butyl and butoxy derivatives, butyl acrylamidobutoxyacetate and butyl ethacrylamidobutoxyacetate.

Further crosslinking monomers C are olefinically unsaturated ketones or aldehydes. Suitable copolymerizable olefinically nsaturated ketones or aldehydes are monomers having at least one aldo or keto group and a polymerizable double bond. Of particular interest are acrolein, methacrolein, diacetoneacrylamide, formylstyrene, vinyl alkyl ketones having preferably 4 to 7 carbons, such as in particular vinyl methyl ketone, vinyl ethyl ketone and vinyl isbbutyl ketone, and/or (meth)acryloyloxyalkylpropanals of the formula (I)

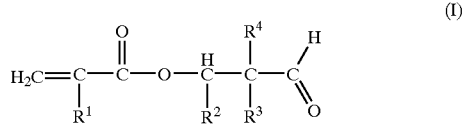

where $R^1$ is hydrogen or methyl, $R^2$ is hydrogen or $C_1$–$C_3$-alkyl, $R^3$ is $C_1$–$C_3$-alkyl and $R^4$ is $C_1$–$C_4$-alkyl. Such (meth)acryloyloxyalkylpropanals can be prepared by the method described in DE-A-27 22 097 by esterifying β-hydroxyalkylpropanals of the formula (II)

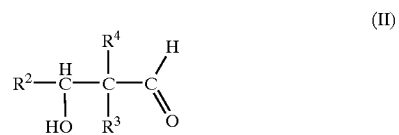

where $R^2$, $R^3$ and $R^4$ are as defined above with acrylic or methacrylic acid in the presence of diluents and small amounts of sulfonic acids and mineral acids. Other suitable keto-carrying monomers are diacetone acrylate, diacetone methacrylate, acetonyl acrylate, 2-hydroxypropyl acrylate acetylacetate and 1,4-butanediol acrylate acetylacetate. The amount of the aldo- or keto-containing copolymerized comonomers is generally from about 0.5 to 10% by weight, preferably from 1 to 5% by weight, based on the monomer amount of the copolymer.

The monomer A is preferably selected from the three following classes in the preferred proportions given above:

Class I
Esters of acrylic and/or methacrylic acid with $C_1$–$C_{12}$-alkanols and/or styrene;
Class II
Styrene and/or conjugated dienes, preferably 1,3-butadiene;
Class III
Vinyl esters and/or aliphatic hydrocarbons having 1 or 2 double bonds and 2 to 8 carbons and/or esters of acrylic and/or of methacrylic acid.

Particular preference is given to mixtures M with monomers of Class I. In a particularly preferred embodiment the mixture M then comprises, as ethylenically unsaturated monomers A, methyl acrylate, ethyl acrylate, n-butyl acrylate, 2-ethylhexyl acrylate, methyl methacrylate, or mixtures thereof. The latter include, in particular, mixtures comprising from 50 to 90% by weight of methyl acrylate, from 10 to 40% by weight of n-butyl acrylate and also, if desired, styrene and/or vinyl acetate.

The free-radical homo- or copolymerization of the mixture M takes place in the presence of a prepolymer which is employed as protective colloid. This prepolymer is preferably prepared, as described below, in situ at the beginning of the polymerization of the mixture M. If desired, however, it is also possible to employ a separately prepared prepolymer.

The prepolymer preferably contains, in copolymerized form, from 0.2 to 5.0% by weight, more preferably from 0.3 to 1.5% by weight and, in particular, from 0.5 to 1.1% by weight of at least one water-soluble monomer B which contains acid groups, the amounts of the monomer B being based on the overall amount of the monomers of mixture M and of the prepolymer. The prepolymer also generally contains from about 3.5 to 6.5% by weight, preferably from 4.0 to 6.0% by weight, of additional monomers selected from the aforementioned monomers A and/or C of the mixture M, likewise based on the overall amount of the monomers of mixture M and of the prepolymer that are to be polymerized, in copolymerized form. The K value of the prepolymer, determined by the method of H. Fikentscher, Cellulose Chemie 13 (1932), p. 58 ff., is not more than 80, preferably not more than 60 and, in particular, not more than 40.

Examples of suitable monomers B are acrylamide and methacrylamide and their N-alkylated derivatives, $\alpha,\beta$-monoethylenically nsaturated $C_3$–$C_6$ mono- and dicarboxylic acids, and the anhydrides and monoesters thereof.

Preferred monomers B are monomers containing acid groups, especially acrylic, methacrylic, maleic, fumaric, itaconic and rotonic acid, maleic anhydride, monoesters of maleic and/or fumaric acid with $C_1$–$C_{10}$-alkanols, vinylsulfonic acids, and their water-soluble salts and/or mixtures thereof. Particularly preferred monomers B are acrylic acid, methacrylic acid or a mixture thereof.

According to one specific embodiment the polymer P is a terpolymer of acrylic acid, methyl acrylate and n-butyl acrylate.

In a preferred embodiment the solubility of the overall amount of the monomers A, B and C in 100 g of water at 25° is chosen such that at least 50% by weight of the monomers have a solubility which is within a range from 1.5 g to 10 g. Preferably at least 50% by weight, in particular at least 70% by weight, of the monomers have a solubility in the range from 4.0 to 10.0 g. according to another preferred embodiment the solubility of the overall amount of the monomers A, B and C in 100 g of water at 25° is chosen so that not more than 50% by weight, preferably from 20 to 30% by weight, of the monomers have a solubility of not more than 0.2 g.

The glass transition temperature of the polymer P is preferably ≦15° C., especially ≦10° C. It is preferably in a range from +5° C. to −5° C. The glass transition temperature of the polymer can be determined by the method of differential thermalanalysis (DTA) or differential scanning calorimetry (DSC, as described in ASTM 3418/82).

The protective colloids employed in accordance with the invention can be employed either as individual dispersants or else in a mixture with other surface-active substances as additives. These can either be added to the novel adhesives, in component a1), or, if desired, added in the formulation of the adhesives, as component d).

Further suitable surface-active additives in a1) and/or d) are the emulsifiers and protective colloids which are commonly employed as dispersants in connection with emulsion polymerization, and as are described, for example, in Houben-weyl, Methoden der organischen Chemie, Volume XIV/1, Makromolekulare Stoffe, Georg-Thieme-Verlag, Stuttgart, 1961, pp. 411–420. Suitable additional protective colloids are, for example, polyvinyl alcohols and partially hydrolyzed polyvinyl acetates, polyacrylates, polyvinylpyrrolidone, cellulose and cellulose derivatives, for example methylcellulose, hydroxyethylcellulose, carboxymethylcellulose, starch and starch derivatives, for example cyanoalkyl ether starch, hydroxyalkyl ether starch, carboxymethylstarch, etc. Suitable emulsifiers include anionic, cationic and nonionic emulsifiers.

As surface-active substances it is preferred to employ emulsifiers, whose relative molecular weights, unlike those of the protective colloids, are usually below 3500 daltons.

Nonionic emulsifiers which can be used are araliphatic or aliphatic nonionic emulsifiers, for example ethoxylated mono-, di- and trialkylphenols (EO units: 3 to 50, alkyl: $C_4$–$C_{10}$), ethoxylates of long-chain alcohols (EO units: 3 to 50, alkyl: $C_8$–$C_{36}$) and polyethylene oxide/polypropylene oxide block copolymers. Preference is given to ethoxylates of long-chain alkanols (alkyl: $C_{10}$–$C_{22}$, mean degree of ethoxylation from 10 to 50) and, of these, particular preference is given to those having a linear $C_{12}$–$C_8$-alkyl radical and a mean degree of ethoxylation of from 10 to 50, and also ethoxylated monoalkylphenols.

Examples of suitable anionic emulsifiers are alkali metal salts and ammonium, salts of alkyl sulfates (alkyl: $C_8$–$C_{22}$), of sulfuric monoesters of ethoxylated alkanols (EO units: 2 to 50, alkyl: $C_{12}$–$C_{18}$) and of ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$–$C_{18}$). Other suitable emulsifiers are given in Houben-Weyl, loc. cit. pp. 192–208. Likewise suitable as anionic emulsifiers are bis(phenylsulfonic acid) ethers and/or the alkali metal or ammonium salts thereof which carry a $C_4$–$C_{24}$-alkyl on one or both aromatic rings. These compounds are generally known, for example from U.S. Pat. No. 4,269,749, and are obtainable commercially, for example as Dowfax® 2A1 (Dow Chemical Company).

Suitable cationic emulsifiers are preferably quaternary ammonium halides, for example trimethylcetylammonium chloride, methyltrioctylammonium chloride, benzyltriethylammonium chloride or quaternary compounds of N—$C_6$–$C_{20}$-alkylpyridines, -morpholines or -imidazoles, for example N-laurylpyridinium chloride.

According to one appropriate embodiment the emulsifier employed is an α-sulfo-ω-(dodecyloxy)poly(oxyethyl) ammonium salt, for example $C_{12}H_{25}(EO)_{30}$ $SO_2NH_4$, obtainable as Disponil® grades from Henkel KGaA.

If one of the abovementioned emulsifiers is used it should be selected in accordance with its compatibility with the prepolymer. The amount of emulsifier is generally from about 0.01 to 10% by weight, based on the amount of polymerized monomers.

The polymerization of the mixture M to form a polymer P, and/or the preparation of the prepolymer, can preferably be carried out in the presence of a starch degradation product as protective colloid. Examples of suitable starch degradation products are those having a weight-average molecular weight of 2500 to 25,000. The starch degradation ;products are obtainable from starch by hydrolysis in the aqueous phase or by thermal degradation (roast dextrins). Starch degradation products obtainable by hydrolysis in the aqueous phase, in contrast to the roast dextrins, are usually referred to as sugared starches and are obtainable commercially (for example the C*PUR products 01906, 01908, 01910, 01912, 01915, 01921, 01924, 01932 or 01934 from Cerestar Deutschland GmbH, Krefeld).

The preparation of sugared starches is generally known and is described, inter alia, in Günther Tegge, Stärke und Stärkederivate, Behr's Verlag, Hamburg 1984, p. 173 and p. 220 ff., and also in EP-A 441 197. The sugared starches to be used in accordance with the invention are preferably those whose weight-average molecular weight $M_w$ is in the range from 4000 to 16,000, particularly preferably in the range from 6500 to 13,000.

Component a1) may additionally comprise at least one seed latex which can be prepared in situ or separately beforehand. The seed latex preferably employed is a previously prepared, fine polystyrene dispersion having a solids content in the range from about 30 to about 35% by weight.

The free-radical copolymerization of the mixture M preferably takes place in the presence of a polymerization regulator as additive a1). In this context, in preparing the novel adhesive dispersions a), the use of butenol, which is regarded as not entirely acceptable from a toxicological standpoint, as polymerization regulator is avoided. The monomer mixture M is preferably polymerized in the presence of mercaptans as polymerization regulators. In this case t-dodecyl mercaptan is preferably employed as polymerization regulator. The amount will then be in general from about 0.01 to 5% by weight, based on the overall amount of the mixture M.

Further customary additives can also be added to the adhesive dispersions a), in the initial charge, in one of the feed streams or after the polymerization has been concluded. Thus it is possible, if desired, to adjust the pH of the dispersion using acids or bases, for example alkali metal hydroxides, carbonates, phosphates or acetates, ammonia, HCl, etc. The prepolymer based on the monomers B containing acid groups is preferably employed in at least partially neutralized form, so that some of component a2) described below is added actually during the preparation of the prepolymer. Other suitable additives are reducing agents and bleaches, for example the alkali metal salts of hydroxymethanesulfinic acid (for example Rongalit® C from BASF AG).

The polymers P are generally prepared as aqueous dispersions having overall solids contents of from 20 to 70% by weight, preferably from 30 to 60% by weight. Alternatively, the polymers can be obtained as powders, for example by spray drying, and can be redispersed.

Component a2)

To formulate the novel adhesive dispersions a), the pH of the aqueous polymer dispersions obtained by free-radical emulsion polymerization in the presence of one of the abovementioned prepolymers can be adjusted by adding a base, for example an alkali metal hydroxide, such as sodium hydroxide or potassium hydroxide, ammonia, a volatile organic amine, preferably mono-, di- or triethanolamine or a mono-, di- or trialkylamine such as ethylamine, dimethylamine, trimethylamine or triethylamine, and cyclic amines, such as pyrrolidine, piperidine, piperazine or morpholine, or mixtures thereof. For neutralization it is preferred to employ sodium hydroxide or ammonia. The pH of the resulting adhesive dispersions a) is from about 6 to 8, preferably about 7.

Component a3)

The adhesive dispersions a) may if desired include a water-miscible solvent. The proportion of organic solvents in the case of the novel adhesives is preferably low and is not more than about 10% by weight based on the overall weight of component a). Examples of suitable water-miscible organic solvents are $C_1$–$C_4$ alcohols, such as methanol, ethanol, n-propanol, isopropanol and n-butanol, or ketones, such as methyl ethyl ketone or acetone. Isopropanol is preferably used.

If desired the adhesive dispersion a) can have further water added to it in addition to the amounts of water present in components a) to a3).

The viscosity of the adhesive dispersion a) is preferably from about 3000 to 7000 mPa·s.

According to one possible process variant the abovementioned adhesive dispersions a) are not formulated separately; instead, the above-described components a1) to a3) are formulated in one step with components b), c) and d) to form the novel adhesive.

Component b)

In the novel process it is possible as component b) to employ generally customary polysaccharides. Examples of these include cellulose, cellulose degradation products, starches, for example natural starches from the group consisting of cornstarch, potato starch, wheat starch, rice starch, tapioca starch, sago starch, sorghum starch, cassava starch, pea starch and mixtures of the natural starches stated. If starches with a defined amylopectin content are desired, then these can be obtained, for example, by starch fractionation of customary natural starches or from those plants which produce virtually pure amylopectin starch. Suitable starches and starch derivatives are described in Günther Tegge, Stärke und Stärkederivate, Hamburg, Behr's-Verlag 1984. In addition to the natural starches, hydrolytically or enzymatically degraded starches are also suitable, for example dextrins, such as white or yellow dextrins and maltodextrins, or oxidized starches, for example dialdehyde starch. Chemically modified starches, for example starches esterified with organic or inorganic acids, in particular phosphated and acetylated starches, and starches etherified with organic halogen compounds, epoxides or sulfates, are also suitable. Starches and processes for their degradation and their chemical modification are described in Ullmanns Encyclopedia of Industrial Chemistry, 5th edition, Volume A25, p. 2 f., which is hereby incorporated by reference.

Further suitable components b) are proteins and/or protein degradation products. Suitable starting proteins are obtained, for example, from animal or vegetable sources. They include, for example, animal proteins, such as gelatin, casein or fish proteins, which are obtained, for example, from hair, horns, hooves, claws, nails, bones or milk by customary techniques. The vegetable proteins include, for example, proteins from rice, wheat, potatoes or oilseeds, which are likewise obtained in a customary manner. To prepare protein degradation products, these starting proteins can be cleaved open with the aid of acids, alkalis or enzymes to give oligopeptides and polypeptides having a lower molecular weight than the starting proteins. To prepare the novel adhesives it is preferred to employ casein. This can be obtained, for example, as casein ST 50 F from Türmerleim.

Component c)

The novel adhesives may additionally comprise at least one filler c). Examples of suitable fillers are chalk, calcite, dolomite, quartz flour, titanium dioxide, aluminum silicate, talc, mica, kieselguhr, gypsum, magnesite, slate flour, barium sulfate, hard polymers or mixtures thereof.

Component c) can be present in the novel adhesives preferably in an amount of from about 40 to 80% by weight.

Component d)

The novel adhesives can additionally comprise at least one emulsifier which, as mentioned above, can be added to component a) during the actual polymerization of the mixture M. Suitable emulsifiers d) are those mentioned above.

Component e)

Examples of additives e) which are suitable in addition are preservatives, dyes, pigments, pigment dispersants, plasticizers, thickeners, phenol-formaldehyde resins, melamine resins, (thio)urea, borax, isocyanates, epoxides, natural latex, other polymer dispersions, for example dispersions based on esters of vinyl alcohol with monocarboxylic acids, such as vinyl formate, vinyl acetate, vinyl propionate, etc., and also polyvinyl alcohol.

Component f)

If desired, an additional amount of water may also be added to the novel adhesives.

The invention additionally provides a process for preparing the above-described adhesives, which comprises i) reacting, in a reactor, at least one water-soluble monomer B which preferably contains acid groups, with or without any further monomers selected from the aforementioned monomers A and/or C, in the presence or absence of components a2) and/or a3) and/or of further additives, to give a prepolymer, ii) reacting the mixture M in the presence of the prepolymer, and in the presence or absence of components a2) and/or a3) and/or of further additives, to give a polymer P, iii) and, if desired, adding at least one further component selected from a2), a3), b), c), d), e), f) and mixtures thereof.

Stage i)

The prepolymer which in the course of polymerization of the mixture M serves as protective colloid is preferably prepared in situ, prior to the polymerization of the mixture M, by the technique of free-radical aqueous emulsion polymerization, generally at from about 30 to 120° C. and preferably from about 40 to 95° C. The polymerization medium can consist either only of water or of mixtures of water with water-miscible liquids such as methanol, for example. Preferably, just water is used. The emulsion polymerization can be carried out either as a batch process or in the form of a feed process, including stage and gradient procedures. Preference is given to the latter feed techniques, in which first the prepolymer is reacted and then the mixture M without isolating the prepolymer in between. A preferred procedure is initially to charge to the reactor a portion of the polymerization medium, which may include a portion of the polymerization batch, to heat this initial charge to the polymerization temperature, to carry out an initial polymerization if desired, with the formation of a seed latex, and then to supply to the polymerization zone the remainder of the batch, usually by way of two or more spatially separate feed streams of which one or more may contain the monomers in pure form or in emulsified form, these feed streams being added continuously, in stages or with the superimposition of a concentration gradient and while maintaining the polymerization.

In accordance with one appropriate embodiment of the novel process the reaction in step i) takes place in the presence of a seed latex. These seed latices can be prepared in situ by introducing an initial charge of appropriate monomers and subjecting them to partial polymerization. It is preferred to employ a prefabricated seed latex, for example the fine polystyrene dispersions indicated earlier as being suitable, which can be added to one of the feed streams or, preferably, to the initial charge.

According to another suitable embodiment of the novel process the reaction in step i) for preparing the prepolymer takes place in the presence of an additional protective colloid. In this case it is preferred to employ the protective colloids based on starch degradation products that were mentioned above as being suitable, and which are preferably added to the initial charge.

The water-soluble monomers B containing acid groups which are employed to prepare the prepolymer are preferably used in partially neutralized form or are partially neutralized in the course of polymerization. According to another preferred embodiment of the novel process, therefore, a portion of the above-described component a1) is included in stage i) in the initial charge or is added to one of the feeds, said component a1) preferably being ammonia. Then the weight ratio of monomer B to ammonia is in general from about 3.5:1 to 7:1, preferably from about 4:1 to 6.5:1, this weight ratio not including the amount of component a2) which is additionally required for adjusting the pH. According to another preferred embodiment, the polymerization regulator described above as component a1) is included in the polymerization batch in step i). In this case, the polymerization regulator can either be included in the initial charge or added to one of the feed streams.

To prepare the prepolymers which are employed in accordance with the invention as protective colloid it is possible to add a portion of the abovementioned monomers A and/or C to the polymerization batch in step i); in that case, these monomers are copolymerized with the water-soluble monomer B which contains acid groups. In step i) it is preferred to react not more than 25% by weight, preferably not more than 10% by weight and, in particular, not more than 6% by weight of the total amount of monomers A and/or B and/or C which are to be polymerized.

Polymerization initiators which can be employed to polymerize the prepolymer and/or the mixture M in steps i) and/or ii) are all compounds which dissociate into free radicals under the polymerization conditions, examples being peroxides, hydroperoxides, hydrogen peroxide, persulfates, azo compounds and the redox catalysts. Preference is given to the use of water-soluble initiators. In some cases it is advantageous to use mixtures of different polymerization initiators, for example mixtures of hydrogen peroxide and sodium or potassium peroxodisulfate. Mixtures of hydrogen peroxide and sodium peroxodisulfate can be used in any desired proportions. Organic peroxides which are likewise suitable as initiators are described in EP-A-0 536 597. The polymerization initiators indicated are employed in customary amounts, for example from 0.01 to 5% by weight, preferably from 0.1 to 2.0% by weight, based on the monomers to be polymerized.

Further suitable initiators are redox catalysts. As oxidizing component, the redox catalysts include at least one of the abovementioned per compounds, and as reducing component they include, for example, ascorbic acid, glucose, sorbose, ammonium or alkali metal hydrogensulfite, sulfite, thiosulfate, hyposulfite, pyrosulfite or sulfide, metal salts such as iron(II) ions or silver ions, or sodium hydroxymethylsulfoxylate.

In general the amount of free-radical initiator systems employed, based on the overall amount of the monomers A and/or B and/or C which are to be polymerized, is from 0.1 to 2% by weight. Particular preference is given to the use—alone or as a constituent of combined systems—of ammonium and/or alkali metal peroxodisulfates as initiators. Particular preference is given to the use of sodium peroxodisulfate.

The free-radical initiator system can either be included entirely in the initial charge to the polymerization vessel or else can be added continuously or in stages, at the rate at which it is consumed in the course of the free-radical aqueous emulsion polymerization in stages i) and/or ii). In each specific case this will depend, as is known, both on the chemical nature of the initiator system and on the polymerization temperature. The initiator system is preferably supplied to the polymerization zone at the rate at which it is consumed.

The free-radical aqueous emulsion polymerization takes place in stages i) and/or ii) in general at atmospheric pressure, although it may also take place at superatmospheric or subatmospheric pressure.

Step ii)

The homo- and/or copolymerization of the mixture M for preparing the aqueous polymer dispersions P by the process of free-radical aqueous emulsion polymerization in the presence of the above-described prepolymers as protective colloids takes place in a customary manner. The polymerization conditions essentially correspond to those for the preparation of the prepolymer. If desired, however, it is also possible to establish polymerization conditions which deviate from those used before. Such conditions include, for example, the choice of a different polymerization temperature, the addition of water-miscible liquids to the polymerization medium, or the use of other of the above-mentioned additives. The reaction in step ii) preferably takes place at a pH in the range from about 4 to 6, preferably from about 4.9 to 5.7. The addition of the monomers and/or of further additives can again be made by way of two or more spatially separate feed streams, in pure or emulsified form, continuously, in stages or with the superimposition of a concentration gradient, while maintaining the polymerization.

The reactions in steps i) and ii) can be carried out either separately, in other words in two or more stages, or else in a single stage in a gradient procedure. According to one preferred embodiment the reactions of stages i) and ii) take place as a two-stage process. In this case, in general, at least 60% by weight, preferably at least 70% by weight and in particular, at least 90% by weight of the total amount of the monomers B is supplied to the reaction zone in the course of 35% of the total polymerization time for preparing the prepolymer and the polymer P.

Step iii)

The formulations of the novel adhesives, especially the mixing of component a) with the other components, can be carried out using the customary apparatus and by the customary methods. The former include, for example, customary stirring devices, which are known to the skilled worker.

The novel adhesive dispersions and the adhesives formulated from them are notable for high viscosity at low shear rates. Alone or in blends with natural substances of high viscosity, preferably with casein, they form films of high tack and low cohesion. Furthermore, in the case of the novel adhesives the use of toxicologically unacceptable components, especially the polymerization regulator butenol, has been avoided. They are therefore suitable for use in the foods sector and do not in general have any health-damaging and/or irritant effect on the processing staff. The novel adhesives advantageously form transparent films which are thus also suitable for the application of film labels.

The invention therefore also provides for the use of the novel adhesives for producing packaging made fom paper, board or card, and for labeling nonabsorbent substrates. The latter include, preferably, substrates of glass, metal and plastics which are employed in particular for the packaging of foodstuffs.

The invention is illustrated in more detail by way of the following nonlimiting examples.

EXAMPLES a) Preparing the Adhesive Dispersions

The solids content of the aqueous polymer dispersions is determined in accordance with DIN 53 189.

Experimental Procedure A

The adhesive dispersion is prepared in two stages, an acid-rich prepolymer being prepared in the first stage and a low-acid polymer in the second stage. An initial charge in accordance with Table 1, comprising the monomer which contains acid groups, is heated to 80° C. Then 5% of feed stream 1 and 30% of feed stream 2, in accordance with Table 1, are added, initial polymerization is carried out at 80° C. for 15 minutes, and then the metered addition of the remainder of feed streams 1 and 2 is begun. Addition takes place continuously over 2 hours (feed stream 1 and 2). Then post-polymerization is carried out at 80° C. for 0.5 hour. Feed streams 3 and 4 are added, and then feed stream 5.

After cooling, the batch is adjusted with ammonia solution to a pH of 7. The solids content of the aqueous polymer dispersion is shown in Table 1.

Experimental Procedure B

Preparation is by the feed technique. The initial charge is heated to 80° C. and the metered addition of feed streams 1, 2 and 3 (monomer containing acid groups) is begun in accordance with Table 1. Addition takes place continuously over 2 hours (feed stream 1), 2.5 hours (feed stream 2) and 0.5 hour (feed stream3). Post-polymerization is then carried out at 80° C. for 0.5 hour. Feed streams 4 and 5 are added.

After cooling, the batch is adjusted with ammonia solution to a pH of 7. The solids content of the aqueous polymer dispersion is shown in Table 1.

Experimental Procedure C

The initial charge is heated to 85° C., and 5% of feed stream 2 is added in accordance with Table 1. Then the metered addition of feed streams 1, 2 and 3 is begun. Addition takes place continuously over 1 hour (feed stream 1), 1.5 hours (feed stream 2) and 0.25 hour (feed stream 3). Then post-polymerization is carried out at 85° C. for 0.5 hour. Feed streams 4 and 5 are added.

After cooling, the batch is adjusted with ammonia solution to a pH of 7. The solids content of the aqueous polymer dispersion is shown in Table 1.

TABLE 1

| Experimental procedure | Example 1<br>A | Example 2<br>B |
|---|---|---|
| Initial charge | 382.60 g water<br>8.40 g AS<br>6.72 g $NH_3$ (25%) | 240.25 g water |
| Feed stream 1 | 390.50 g water<br>32.00 g NLS (15%)<br>6.00 g t-DMK<br>900.00 g MA<br>291.60 g n-BA | 358.00 g water<br>8.00 g Disponil (30%)<br>16.00 g NLS (15%)<br>6.00 g t-DMK<br>900.00 g MA<br>288.00 g N-BA |
| Feed stream 2 | 144.00 g NaPS (5%) | 144.00 g NaPS (5%) |
| Feed stream 3 | 11.15 g water<br>0.89 g t-BHP | 200.00 g water<br>12.00 g AS<br>9.60 g $NH_3$ (25%) |
| Feed stream 4 | 2.40 g water<br>0.60 g Rongalit C<br>0.06 g Fe(II)$SO_4$ | 20.00 g water<br>3.43 g t-BHP |
| Feed stream 5 | 43.00 g water | 20.00 g water<br>2.40 g Rongalit C<br>0.06 g Fe(II)$SO_4$ |
| Solids content | 54.9% | 53.3% |
| Expedimental procedure | Example 3<br>B | Example 4<br>C |
| Initial charge | 292.37 g water<br>3.64 g seed latex<br>63.16 g C Pur 01915 | 234.58 g water |
| Feed stream 1 | 358.00 g water<br>4.00 g Disponil (30%)<br>8.00 g NLS (15%)<br>6.00 g t-DMK<br>900.00 g MA<br>288.00 g n-BA | 358.00 g water<br>6.00 g Disponil (30%)<br>12.00 g NLS (15%)<br>7.20 g t-DMK<br>456.00 g S<br>708.00 g n-BA |
| Feed stream 2 | 144.00 g NaPS (5%) | 144.00 g NaPS (5%) |

TABLE 1-continued

| Feed stream 3 | 200.00 g water | 200.00 g water |
|---|---|---|
| | 12.00 g AS | 36.00 g AS |
| | 9.60 g NH$_3$ (25%) | 28.80 g NH$_3$ (25%) |
| Feed stream 4 | 20.00 g water | 20.00 g water |
| | 3.43 g t-BHP | 3.43 g t-BHP |
| Feed stream 5 | 20.00 g water | 20.00 g water |
| | 2.40 g Rongalit C | 2.40 g Rongalit C |
| | 0.06 g Fe(II)SO$_4$ | 0.06 g Fe(II)SO$_4$ |
| Solids content | 56.3% | 53.4% |

| Abbreviations |
|---|
| AS = acrylic acid |
| n-BA = n-butyl acrylate |
| t-BHP ® = t-butyl hydroperoxide |
| C Pur ®01915 = maltodextrin from Cerestar |
| t-DMK = t-dodecyl mercaptan |
| MA = methyl acrylate |
| NaPS = sodium peroxodisulfate |
| NH$_3$ = ammonia solution (25% strength) |
| NLS = sodium lauryl sulfate solution (15% strength) |
| Disponil ® = Disponil ® FES 77 = α-sulfo-ω-(dodecyloxy)poly(oxyethylene) ammonium salt C$_{12}$H$_{25}$(EO)$_{30}$SO$_3$NH$_4$ (Henkel KGaA) |
| Rongalit C ® = sodium salt of hydroxymethanesulfinic acid (BASF AG) |
| S = styrene |
| Seed latex = fine polystyrene dispersion at 33% |
| Water = deionized water |

Water=deionized water

Rheological Behavior

Table 2 shows the rheological behavior of the adhesive dispersions. The comparison employed was a customary commercial dispersion based on an acrylic ester copolymer.

TABLE 2

Viscosity as a function of shear rate

| Shear rate [l/s] | Example 1 [mPa · s] | Example 2 [mPa · s] | Example 3 [mPa · s] | Example 4 [mPa · s] | Comparison [mPa · s] |
|---|---|---|---|---|---|
| 25 | 7000 | 6200 | 5600 | 5600 | 3500 |
| 45 | 4600 | 4000 | 4000 | 3700 | 2600 |
| 100 | 2400 | 2100 | 2500 | 2000 | 1700 |
| 250 | 1300 | 1100 | 1300 | 1100 | 1100 |
| 500 | 970 | 790 | 790 | 690 | 800 |

The flow curves (0–500 1/s) were plotted in accordance with DIN 53019 on a Contraves Rheomat 115 instrument. The viscosities at the shear rates 25, 45, 100, 250 and 500 1/s are recorded.

Summary: The Examples according to the invention, like the customary commercial comparison dispersion, possess the necessary rheological properties which are the features of a packaging adhesive.

Adhesion Spectrum

The adhesion properties are examined on preprimed cotton strips on different substrates. For this purpose, cotton strips (approximately 150×20 mm) are preprimed with the dilute adhesive according to the invention (3 parts of adhesive to 1 part of water) using a 0.7 mm doctor blade. At the same time, the undiluted adhesive is applied to the various substrates using a 1.2 mm doctor blade and is bonded immediately, while wet, to the primer-treated and likewise still wet cotton strips. Then a 2.5 kg roller is rolled four times over the adhesive bond. After drying for 3 days under standard climatic conditions (23° C./50% relative atmospheric humidity) the peel strength is measured. This is done using a tensile testing machine having a rate of advance of 100 mm/min, with a preliminary path of 20 mm and a testing section of 100 mm. The results are shown in Table 3.

TABLE 3

| Adhesion spectrum* in N/10 mm: | Ex. 1 | Ex. 2 | Ex. 3 | Ex. 4 | Comparison |
|---|---|---|---|---|---|
| PETP, 0050 mm | 5 | 3.9 | 4.1 | 6.4 | 3.1 |
| PE, 0.100 mm | 0.1 | 0.3 | 0.3 | 0.3 | 0.2 |
| PP, 0040 mm | 0.8 | 0.5 | 0.5 | 0.5 | 0.5 |
| Glass | 14.7 | 9.7 | 8.8 | 17.0 | 11.1 |
| PVC, 0.250 mm | 5.0 | 4.8 | 4.2 | 1.3 | 5.1 |
| UV-coated card | 1.0 | 1.2 | 1.0 | 1.3 | 1.3 |

*with preprimed cotton strips
Take-off speed: 100 mm/min

In general, equal or superior results are achieved with the novel adhesive dispersions than with the comparison dispersions.

b) Preparing Adhesive Formulations

To prepare adhesives, the novel adhesive dispersions of Examples 1, 2, 3 and 4, and the comparison dispersion, are blended in a proportion of 20 parts of adhesive dispersion to 50 parts of Casein ST 50 F from Turmerleim. Subsequently, the adhesion properties were again measured by the method described above. The results are shown in Table 4.

TABLE 4

| 20 parts of acrylate dispersion and 50 parts of Casein ST 50 F | | | | | |
|---|---|---|---|---|---|
| Adhesion spectrum* in N/10 min: | Ex. 1 | Ex. 2 | Ex. 3 | Ex. 4 | Comparison |
| Glass | 9.5 | 9.0 | 10.3 | 16.1 | 3.3 |

*with preprimed cotton strips
Take-off speed: 100 mm/min

Film Properties

To determine the film properties, the elongation at break of the film is determined in accordance with DIN 53455 and the film is assessed visually. The results are shown in Table 5.

TABLE 5

| | Film properties | | | | |
|---|---|---|---|---|---|
| | Ex. 1 | Ex. 2 | Ex. 3 | Ex. 4 | Comparison |
| Film tear values: Elongation at break in % | >1500 | >1500 | >1500 | >1000 | >1500 |
| Appearance of the film | clear | clear | clear | clear | cloudy |

Summary: Example and Comparison possess an equally high elongation at break in %; however, the film of the novel Example is clear while the comparison film is cloudy. This is a further significant performance advantage.

Ecological Advantage:

The comparison dispersion contains butenol. From a toxicological standpoint it is desirable to use products which do not include butenol. The novel dispersion achieves and surpasses the properties of the comparison without the need to use butenol. From an ecological standpoint, this is a significant advantage over the prior art.

We claim:

1. An adhesive comprising from 5.0 to 95.0% by weight of an adhesive dispersion having a viscosity in the range from 2000 to 10,000 mPa·s, said adhesive dispersion consisting essentially of
   1) an aqueous polymer dispersion which is obtained by
      i) reacting a water soluble monomer B selected from the group consisting of acrylic acid, methacrylic acid, and mixtures thereof, with or without a further monomer A selected from the group consisting of esters of $\alpha,\beta$-unsaturated $C_3$–$C_6$ mono- and dicarboxylic acids, and vinylaromatic compounds; by free radical aqueous emulsion polymerization, to give a water-soluble prepolymer, and then without isolating the prepolymer;
      ii) reacting a monomer mixture M, which comprises:
         A) 50 to 100% by weight, of at least one ethylenically unsaturated monomer A; and
         B) from 0 to 50% by weight of a comonomer C, by free-radical aqueous emulsion polymerization in the presence of a protective colloid, which is said water-soluble prepolyrner, to give a polymer P;
   wherein the water-soluble prepolymer comprises from 0.2 to 1.5% by weight of at least one polymerized unit of monomer B, based on the overall amount of the monomers M and the prepolymer; and the following optional ingredients:
   2) a base selected from the group consisting of alkali metal hydroxides, ammonia and volatile organic amines; and
   3) one or more further additives selected from the group consisting of a polysaccharide, a protein, a protein degradation product, a filler, an emulsifier, water and mixtures thereof.

2. The adhesive of claim 1, wherein the mixture M contains from 60 to 99.9% by weight of said at least one monomer A, and from 0.1 to 40% by weight of said at least one comonomer C.

3. The adhesive of claim 1, where the prepolymer contains, in copolymerized form, from 0.5 to 1.1% by weight, of monomer B, based on the overall amount of the monomers of the mixture M and of the prepolymer.

4. The adhesive of claim 1, where the monomer A is selected from the group consisting of esters of acrylic and methacrylic acid with methanol, ethanol, n-propanol, isopropanol, n-butanol, isobutanol and 2-ethylhexanol; styrene; $\alpha$-methylstyrene; p-methylstyrene; $\alpha$-n-butylstyrene; p-n-butylstyrene; p-n-decylstyrene; o-chlorostyrene; vinyltoluenes; and mixtures thereof.

5. The adhesive of claim 1, where the comonomer C is selected from the group consisting of vinyl halides; vinylidene halides; $\alpha,\beta$-ethylenically unsaturated nitrites; $C_2$–$C_6$ monoolefins; nonaromatic hydrocarbons having at least two olefinic double bonds; hydroxyalkyl acrylates and methacrylates; acrylamide; methacrylamide; N-alkyl compounds of acrylamide and methacrylamide; olefinically unsaturated ketones; olefinically unsaturated aldehydes; and mixtures thereof.

6. The adhesive of claim 1, the free-radical polymerization of the mixture M is carried out in the presence of a mercaptan as a polymerization regulator.

7. The adhesive of claim 1, where the free-radical polymerization of the mixture M is carried out in the presence of a seed latex.

8. The adhesive of claim 1, where the glass transition temperature of the polymer P is $\leq 15°$ C.

9. The adhesive of claim 1, where the glass transition temperature of the polymer P is $\leq 10°$ C.

10. The adhesive of claim 1, where the base is an alkali metal hydroxide or ammonia.

11. The adhesive of claim 10, where the weight ratio of monomer B to the base is from 3.5:1 to 7:1.

12. The adhesive of claim 10, where the weight ratio of monomer B to the base is from 4:1 to 6.5:1.

13. The adhesive of claim 10, where the viscosity of the adhesive dispersion is within a range from 3000 to 7000 mPa·s.

14. The adhesive of claim 10, wherein the further additive 3) is a protein.

15. The adhesive of claim 10, wherein the further additive 3) is casein.

16. The adhesive of claim 10, wherein the monomer A is selected from the group consisting of methyl acrylate, ethyl acrylate, n-butyl acrylate, 2-ethylhexyl acrylate, methyl methacrylate and mixtures thereof.

17. The adhesive of claim 1, wherein the base is a volatile organic amine selected from the group consisting of mono-, di-, triethamolamine; mono-, di-, trialkylamine; pyrrolidine; piperidine; piperazine; and morpholine.

18. The adhesive of claim 1, having a pH of about 6 to 8.

19. The adhesive of claim 18, having a pH of about 7.

* * * * *